(12) United States Patent
Kameyama et al.

(10) Patent No.: US 11,927,964 B2
(45) Date of Patent: Mar. 12, 2024

(54) AUTONOMOUS WORK MACHINE, METHOD OF CONTROLLING THE SAME, AND STORAGE MEDIUM

(71) Applicant: HONDA MOTOR CO., LTD., Tokyo (JP)

(72) Inventors: Naoki Kameyama, Wako (JP); Keiji Muro, Wako (JP); Minami Kigami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 441 days.

(21) Appl. No.: 17/314,827

(22) Filed: May 7, 2021

(65) Prior Publication Data

US 2021/0263521 A1 Aug. 26, 2021

Related U.S. Application Data

(63) Continuation of application No. PCT/JP2018/042332, filed on Nov. 15, 2018.

(51) Int. Cl.
*G05D 1/00* (2006.01)
*A01D 34/00* (2006.01)
(Continued)

(52) U.S. Cl.
CPC ......... *G05D 1/0214* (2013.01); *A01D 34/008* (2013.01); *G07C 5/04* (2013.01); *A01D 2101/00* (2013.01)

(58) Field of Classification Search
CPC .... G05D 1/0265; G05D 1/0219; G05D 1/106; G05D 1/0274; G05D 1/0214; B25J 13/08
See application file for complete search history.

(56) References Cited

U.S. PATENT DOCUMENTS 9,063,547 B2 6/2015 Yamamura et al.
2002/0013641 A1* 1/2002 Nourbakhsh ........ G05D 1/0214
700/245

(Continued)

FOREIGN PATENT DOCUMENTS

JP 2005339408 A * 12/2005 .............. B25J 13/08
JP 2005339408 A 12/2005
(Continued)

OTHER PUBLICATIONS

International Search Report for PCT/JP2018/042332 dated Jan. 29, 2019.

*Primary Examiner* — Yuri Kan
(74) *Attorney, Agent, or Firm* — Thomas| Horstemeyer, LLP

(57) ABSTRACT

An autonomous work machine that works in a work area while autonomously traveling in the work area, comprises a specification unit configured to specify, based on information of a position detection unit configured to detect position information, a self-position of the autonomous work machine, a determination unit configured to determine, based on the self-position, whether the autonomous work machine has reached a perimeter portion of a no-work area positioned within the work area, and a control unit configured to control the autonomous work machine to do a lap along the perimeter portion in a case in which the autonomous work machine is determined to have reached the perimeter portion.

21 Claims, 11 Drawing Sheets

(51) Int. Cl.
*A01D 101/00* (2006.01)
*G07C 5/04* (2006.01)

(56) References Cited

U.S. PATENT DOCUMENTS

| | | | | |
|---|---|---|---|---|
| 2004/0083570 A1* | 5/2004 | Song | ................... | G05D 1/0274 |
| | | | | 15/340.1 |
| 2013/0211646 A1 | 8/2013 | Yamamura et al. | | |
| 2017/0278404 A1* | 9/2017 | Gordon | ................. | G05D 1/106 |
| 2020/0275814 A1* | 9/2020 | Jo | ....................... | G05D 1/0219 |
| 2020/0356110 A1* | 11/2020 | Holgersson | .......... | G05D 1/0265 |

FOREIGN PATENT DOCUMENTS

| | | | |
|---|---|---|---|
| JP | 201099365 A | 5/2010 | |
| JP | 2013165588 A | 8/2013 | |
| JP | 2016212697 A | 12/2016 | |
| WO | 2020100265 A1 | 5/2020 | |

* cited by examiner

AUTONOMOUS WORK MACHINE, METHOD OF CONTROLLING THE SAME, AND STORAGE MEDIUM

CROSS-REFERENCE TO RELATED APPLICATION(S)

This application is a continuation of International Patent Application No. PCT/JP2018/042332 filed on Nov. 15, 2018, the entire disclosure of which is incorporated herein by reference.

BACKGROUND OF THE INVENTION

Field of the Invention

The present invention relates to an autonomous work machine, a method of controlling the same, and a storage medium.

Description of the Related Art

PTL 1 discloses, for example, an autonomous work machine that detects a magnetic field strength of an area wire arranged on the periphery of a work area and travels while detecting an interval distance from the area wire based on the detected magnetic field strength.

CITATION LIST

Patent Literature

PTL 1: Japanese Patent Laid-Open No. 2013-165588

SUMMARY OF THE INVENTION

Technical Problem

However, in the arrangement of the conventional technique, if there is a no-work area in a work area, the shape of the no-work area may not be reflected in a map of the work area in some cases. In such a case, the map of the work area map will be set in a state that does not reflect the shape of the no-work area, and when the progress of the work is to be calculated, the progress of the work may be calculated to be less than the actual progress.

In consideration of the above problem, the present invention provides a technique in which an autonomous work machine can specify the shape of the perimeter portion of a no-work area by doing a lap along the perimeter portion of the no-work area.

Solution to Problem

According to one aspect of the present invention, there is provided an autonomous work machine that works in a work area while autonomously traveling in the work area, comprising:
 a specification unit configured to specify, based on information of a position detection unit configured to detect position information, a self-position of the autonomous work machine;
 a determination unit configured to determine, based on the self-position, whether the autonomous work machine has reached a perimeter portion of a no-work area positioned within the work area; and
 a control unit configured to control the autonomous work machine to do a lap along the perimeter portion in a case in which the autonomous work machine is determined to have reached the perimeter portion.

Advantageous Effects of Invention

According to the present invention, the shape of the perimeter portion of a no-work area can be specified by doing a lap along the perimeter portion of the no-work area.

Other features and advantages of the present invention will be apparent from the following description taken in conjunction with the accompanying drawings. Note that the same reference numerals denote the same or like components throughout the accompanying drawings.

DESCRIPTION OF EMBODIMENTS

First Embodiment

Embodiments of the present invention will be described hereinafter with reference to the accompanying drawings. Components described in the embodiments are merely exemplary and are not limited by the following embodiments.

(Outline of Autonomous Work Machine)

Figure 1:
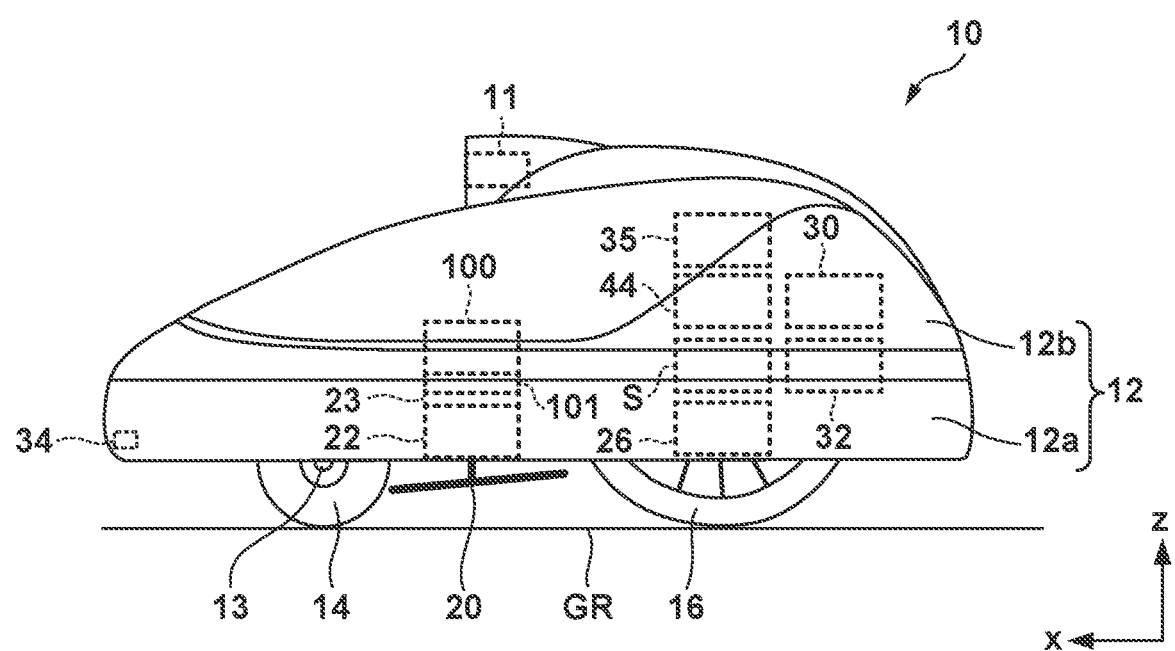
FIG. 1 is a schematic view in which an autonomous work machine according to an embodiment is viewed from the side.

FIG. 1 is a schematic view in which an autonomous work machine is viewed from the side. In the following description, the direction of travel (vehicle longitudinal direction) of the autonomous work machine in a side view, a lateral direction (vehicle width direction) orthogonal to the direction of travel, and a perpendicular direction orthogonal to the direction of travel and the lateral direction are defined as a front-and-rear direction, a left-and-right direction, and a vertical direction, respectively, and the arrangement of each component will be explained in accordance with these directions.

In FIG. 1, reference numeral 10 denotes an autonomous work machine that works in a work area while autonomously traveling in the work area. The autonomous work machine 10 can function as, for example, a lawn mower, a weeder, snow removal equipment, a golf ball collector, a tiller, or the like that can work while autonomously traveling in a work area. However, the example of the autonomous work machine is merely an example, and the present invention is applicable to other kinds of work machines. In the following description, the arrangement of a lawn mower whose work area is a plot of lawn will be exemplified to describe the embodiments of the present invention.

As shown in FIG. 1, the autonomous work machine 10 includes a camera unit 11, a vehicle body 12, a stay 13, front wheels 14, rear wheels 16, a blade 20, a work motor 22, a motor holding member 23, a blade height adjustment motor 100, and a translation mechanism 101. The autonomous work machine 10 also includes travel motors 26, various kinds of sensors S, an electronic control unit (ECU) 44, a charging unit 30, a battery 32, a charging terminal 34, and a notification unit 35.

The camera unit 11 of the autonomous work machine 10 includes a plurality of cameras that can capture the state at the front of the autonomous work machine 10 and calculate and obtain distance information between the autonomous work machine 10 and an object, which is present in the front of the autonomous work machine, by using the image captured by the camera unit 11 which has a parallax between the plurality of cameras.

The vehicle body 12 of the autonomous work machine 10 includes a chassis 12a and a frame 12b attached to the chassis 12a. Two front wheels 14 (a left front wheel 14L and a right front wheel 14R) as left and right small-diameter wheels are fixed to the front part of the chassis 12a via the stay 13. Two rear wheels 16 (a left rear wheel 16L and a right rear wheel 16R) as left and right large-diameter wheels are attached to the rear part of the chassis 12a.

The blade 20 is a rotary blade for lawn mowing attached near the central position of the chassis 12a. The work motor 22 is an electric motor arranged above the blade 20. The blade 20 is connected to and rotated by the work motor 22. The motor holding member 23 holds the work motor 22. The rotation of the motor holding member 23 is regulated with respect to the chassis 12a. In addition, the vertical movement of the motor holding member 23 is permitted by a combination of a guide rail and a slider which can move vertically by being guided by the guide rail.

The blade height adjustment motor 100 is a motor for adjusting the height of the blade 20 in the vertical direction from a ground surface GR. The translation mechanism 101 is connected to the blade height adjustment motor 100, and converts the rotation of the blade height adjustment motor 100 into a vertical translational movement. The translation mechanism 101 is also connected to the motor holding member 23 for holding the work motor 22.

The rotation of the blade height adjustment motor 100 is converted into the translational movement (vertical movement) by the translation mechanism 101, and this translational movement is transmitted to the motor holding member 23. The translational movement (vertical movement) of the motor holding member 23 causes the work motor 22 held by the motor holding member 23 to translationally move (vertically move). The height of the blade 20 from the ground surface GR can be adjusted by the vertical movement of the work motor 22.

The travel motors 26 (a left travel motor 26L and a right travel motor 26R) are two electric motors (motors) attached to the chassis 12a of the autonomous work machine 10. The two electric motors are connected to the left and right rear wheels 16. The left and right rear wheels are independently rotated forward (rotated in an advancing direction) or rotated backward (rotated in a reversing direction) by using the front wheels 14 as driven wheels and the rear wheels 16 as driving wheels. This allows the autonomous work machine 10 to move in various directions.

The charging terminal 34 is a charging terminal installed in the front end position of the frame 12b in the front-and-rear direction, and can receive power from a charging station ST (FIG. 4) when connected to a corresponding charging terminal 208 of the charging station. The charging terminal 34 is connected to the charging unit 30 by a wiring line, and the charging unit 30 is connected to the battery 32. The work motor 22, the travel motors 26, and the blade height adjustment motor 100 are also connected to the battery 32, and receive power from the battery 32.

The ECU 44 is an electronic control unit including a microcomputer formed on a circuit board, and controls the operation of the autonomous work machine 10. Details of the ECU 44 will be described later. The notification unit 35 notifies a user of the occurrence of an abnormality in a case in which an abnormality has occurred in the autonomous work machine 10. For example, notification can be performed by sound or display. Alternatively, notification can be performed by outputting an abnormality generation notification to an external device which is wirelessly connected to the autonomous work machine 10. The user can be notified of the occurrence of an abnormality through the external device.

(Control Block Diagram)

Figure 2:
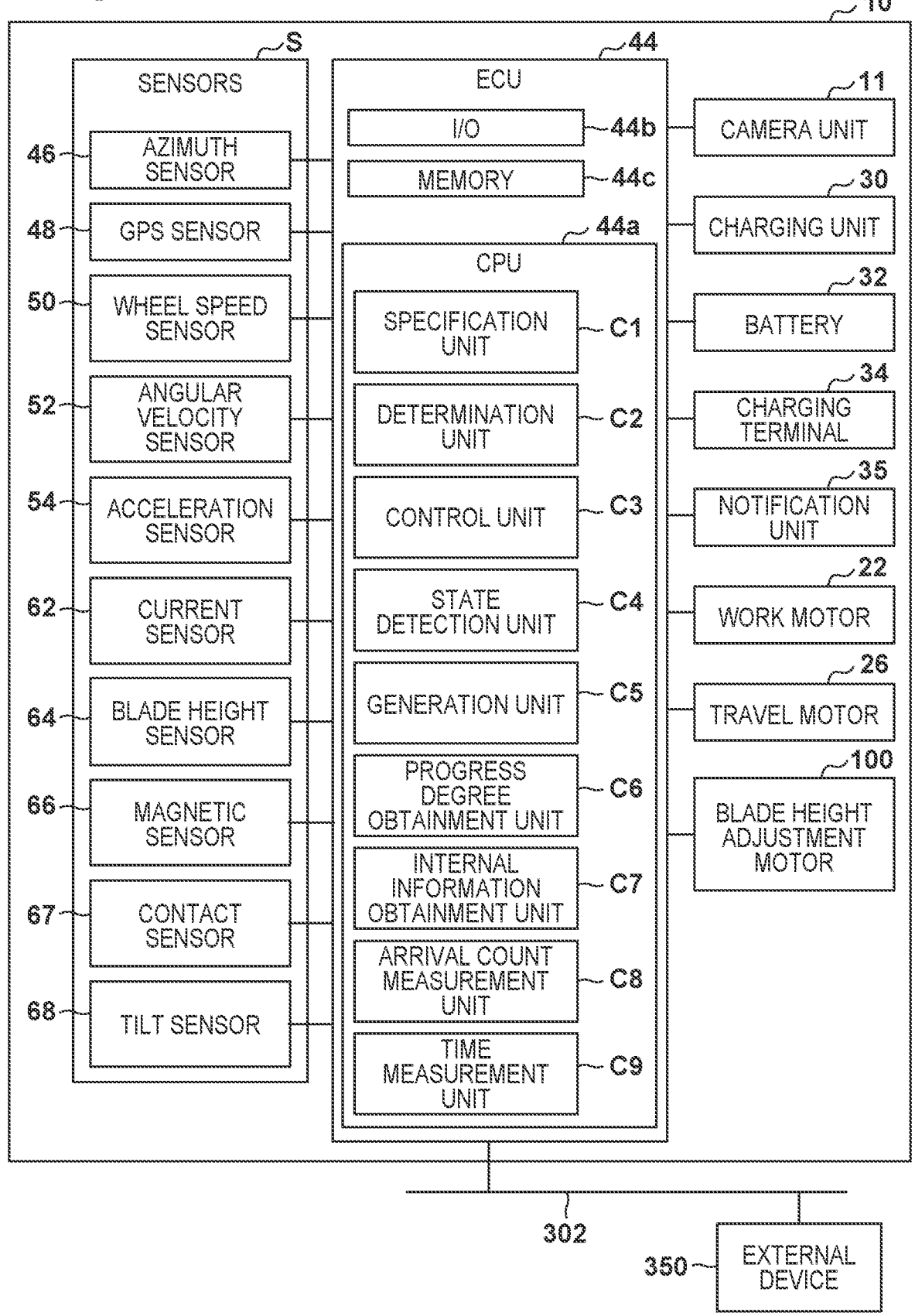
FIG. 2 is a block diagram showing the relationship of inputs/outputs of an electronic control unit (ECU) that controls the autonomous work machine according to the embodiment.

FIG. 2 is a block diagram showing the relationship of inputs/outputs of the electronic control unit (ECU) that controls the autonomous work machine 10. As shown in FIG. 2, the ECU 44 includes a CPU 44a, an I/O 44b, and a memory 44c. The memory 44c is a ROM (Read Only Memory), an EEPROM (Electrically Erasable Programmable Read Only Memory), a RAM (Random Access Memory), or the like. The memory 44c stores a work schedule of the autonomous work machine 10, information about a work area, various kinds of programs for controlling the operation of the autonomous work machine 10, and a map of the work area. The generation of a map of the work area will be described later. The ECU 44 can operate as each processing unit for implementing the present invention by reading out and executing a program stored in the memory 44c.

The ECU 44 is connected to the various kinds of sensors S. The sensors S include an azimuth sensor 46, a GPS sensor 48, a wheel speed sensor 50, an angular velocity sensor 52, an acceleration sensor 54, a current sensor 62, and a blade height sensor 64.

The azimuth sensor 46 and the GPS sensor 48 are sensors for obtaining information of the direction and the position of the autonomous work machine 10. The azimuth sensor 46 detects the azimuth corresponding to the terrestrial magnetism. The GPS sensor 48 receives radio waves from GPS satellites and detects information indicating the current position (the latitude and the longitude) of the autonomous work machine 10.

The wheel speed sensor 50, the angular velocity sensor 52, and the acceleration sensor 54 are sensors for obtaining information on the state of the movement of the autonomous work machine 10. The wheel speed sensor 50 detects the wheel speeds of the left and right rear wheels 16. The angular velocity sensor 52 detects the angular velocity around the vertical axis (the z-axis in the perpendicular direction) in the barycentric position of the autonomous work machine 10. The acceleration sensor 54 detects accelerations in the directions of three perpendicular axes, that is, the x-, y-, and z-axes, which act on the autonomous work machine 10.

The current sensor 62 detects the current consumption (power consumption) of the battery 32. The detection result of the current consumption (power consumption) is saved in the memory 44c of the ECU 44. When a predetermined power amount is consumed and the power amount stored in the battery 32 becomes equal to or lower than a threshold value, the ECU 44 executes control to return the autonomous work machine 10 to the charging station ST (FIG. 4) in order to charge the autonomous work machine 10.

The blade height sensor 64 detects the height of the blade 20 from the ground surface GR. The blade height sensor 64 outputs the detection result to the ECU 44. Under the control of the ECU 44, the blade height adjustment motor 100 is driven, and the blade 20 vertically moves, thereby adjusting the height from the ground surface GR.

Magnetic sensors 66 (a right magnetic sensor 66R and a left magnetic sensor 66L) are arranged at symmetrical positions to each other in the left-and-right direction of the autonomous work machine 10. Each magnetic sensor outputs a signal indicating the magnitude of the magnetic field (magnetic field strength) to the ECU 44.

The frame 12b of the vehicle body 12 also includes a contact sensor 67 that outputs an ON signal to the ECU 44 when the vehicle body 12 comes into contact with an obstacle.

A tilt sensor 68 outputs, upon detecting that the autonomous work machine 10 has tilted, a signal to the ECU 44. The ECU 44 can obtain, based on the signal from the tilt sensor 68, a tilt angle (gradient) of the work area in which the autonomous work machine 10 is traveling.

The outputs from the various sensors S are input to the ECU 44 via the I/O 44b. Based on the outputs from the various sensors S, the ECU 44 supplies power from the battery 32 to the travel motors 26, the work motor 22, and the height adjustment motor 100. The ECU 44 controls the travel motors 26 by outputting a control value via the I/O 44b, thereby controlling travel of the autonomous work machine 10. The ECU 44 also controls the height adjustment motor 100 by outputting a control value via the I/O 44b, thereby controlling the height of the blade 20. Furthermore, the ECU 44 controls the work motor 22 by outputting a control value via the I/O 44b, thereby controlling the rotation of the blade 20. The I/O 44b can function as a communication interface, and can communicate with an external device (for example, a communication device such as a smartphone, a personal computer, or the like) 350 via a network 302.

ECU 44 includes a specification unit C1, a determination unit C2, a control unit C3, a state detection unit C4, a generation unit C5, a progress degree obtainment unit C6, an internal information obtainment unit C7, an arrival count measurement unit C8, and a time measurement unit C9 as functional components for implementing the present invention by reading out and executing programs stored in the memory 44c. The functional components C1 to C9 of the autonomous work machine 10 will be described in detail later.

(Outline of Work Area and No-Work Area)

Figure 3:
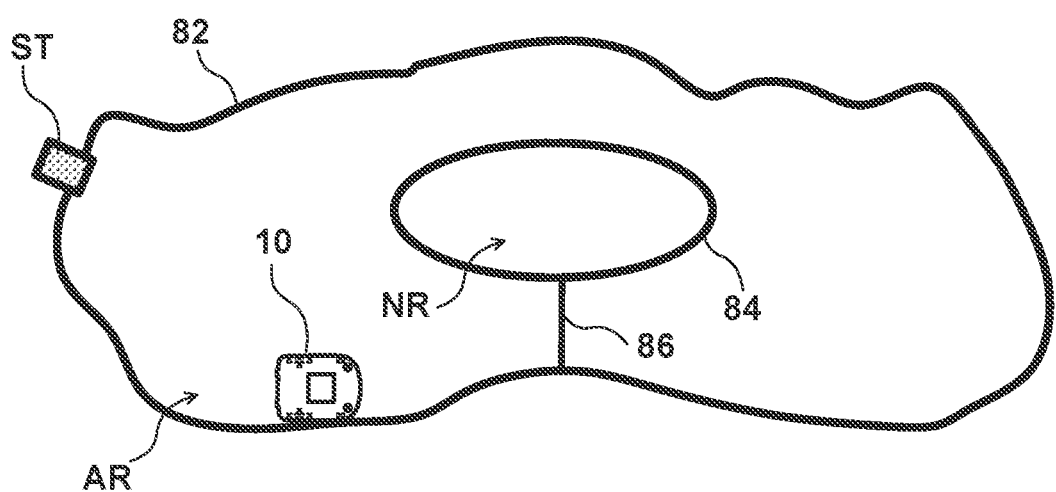
FIG. 3 is a view for explaining the outline of a work area and a no-work area.
Figure 4:
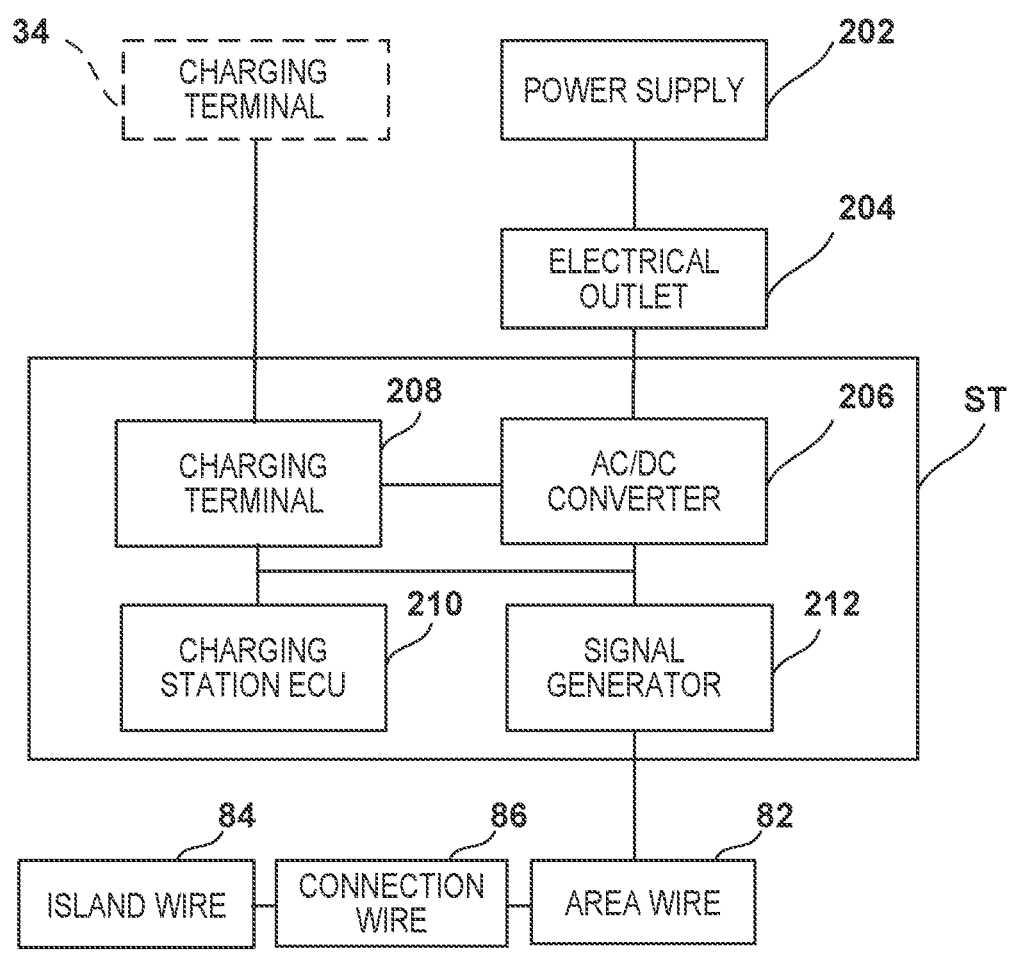
FIG. 4 is a block diagram showing the arrangement of a charging station ST.

FIG. 3 is a view for explaining the outline of a work area and a no-work area, and FIG. 4 is a block diagram showing the arrangement of the charging station ST.

As shown in FIG. 3, a work area AR is delineated by an area wire (electrical wire) 82 that is installed around the perimeter (boundary) or buried in the ground along the perimeter of the work area. The charging station ST for charging the battery 32 included in the autonomous work machine 10 is installed inside the work area AR.

A no-work area NR is arranged inside the work area AR. The no-work area NR includes an obstacle, for example, a pond, a house, a flowerbed, a rock, or the like in the work area AR. The no-work area NR is delineated by an island wire (electrical wire) 84 installed around the perimeter portion (boundary) or buried in the ground along the perimeter portion of the no-work area NR. The area wire (electrical wire) 82 and the island wire (electrical wire) 84 are electrically connected to each other by a connection wire 86. The sizes of the charging station ST and the autonomous work machine 10 are shown schematically in FIG. 3, and the actual scale with respect to the work area AR is not limited to that of FIG. 3.

As shown in FIG. 4, the charging station ST is connected to a power supply 202 via an electrical outlet 204. The charging station ST includes an AC/DC converter 206, the charging terminal 208, a signal generator 212, and a charging station ECU (electronic control unit) 210 which is formed by a microcomputer that controls the operations of the AC/DC converter 206 and the signal generator 212.

In the charging station ST, the alternating current voltage supplied from the power supply 202 through the electrical outlet 204 is converted into a predetermined direct current voltage by the AC/DC converter 206 and supplied to the charging terminal 208. When the autonomous work machine 10 that has returned to a charging ST 200 is connected (docked) by connecting the charging terminal 34 to the charging terminal 208 of the charging station ST, the battery 32 of the autonomous work machine 10 is charged by the voltage supplied via the charging terminal 34 and the charging terminal 208.

The output from the AC/DC converter 206 is supplied to the signal generator 212 and the charging station ECU 210. The charging station ECU 210 controls the operation of the signal generator 212 based on the output from the AC/DC converter 206.

Under the control instruction from the charging station ECU 210, the signal generator 212 converts the direct current voltage adjusted by the AC/DC converter 206 into a predetermined signal and energizes the area wire 82. The area wire 82, the island wire 84, and the connection wire 86 are electrically connected, and the island wire 84 and the connection wire 86 are energized via the area wire 82.

When the signal generator 212 causes a current to flow through the area wire 82 and the island wire 84, a magnetic field is generated in a right concentric circle about each of the area wire 82 and the island wire 84 in accordance with the corkscrew rule. Since the magnetic field generated by the current flowing from the area wire 82 to the island wire 84 is canceled by the magnetic field by the current flowing from the island wire 84 to the area wire 82, a magnetic field is not generated from the connection wire 86. Hence, the autonomous work machine 10, which performs a trace travel operation based on the magnetic field of the area wire 82, will be able to do laps around the work are in the trace travel operation along the area wire 82 without branching to the side of the connection wire 86.

Note that although an arrangement in which the area wire 82 and the island wire 84 are energized by the one power supply 202 is exemplified in FIG. 4, power may be supplied to the area wire 82 and the island wire 84 by arranging separate power supply sources without arranging the connection wire 86.

Figure 5:
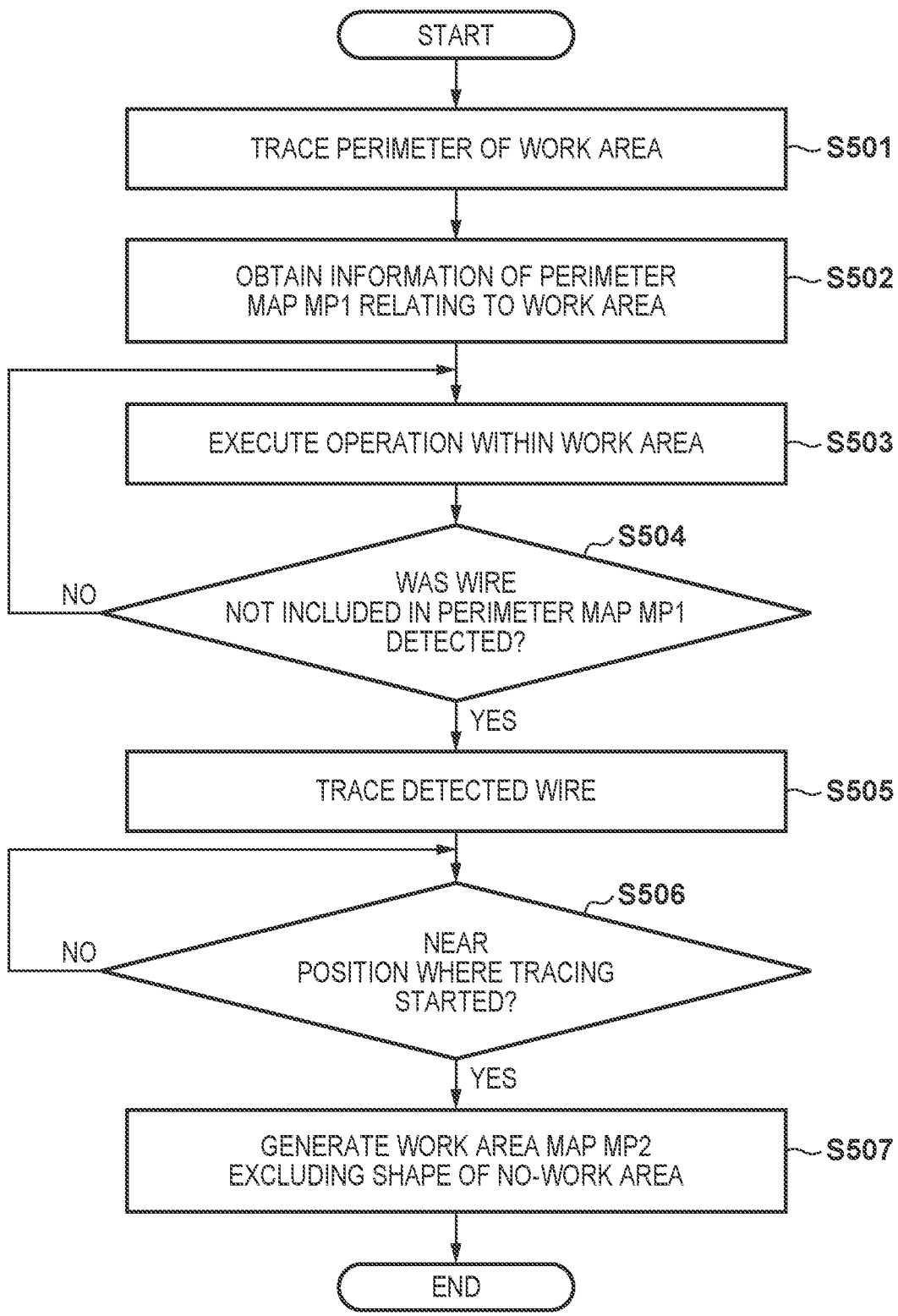
FIG. 5 is a view for explaining a trace travel operation of the autonomous work machine.

FIG. 5 is a flowchart for explaining the processing procedure executed by the autonomous work machine 10. The processing procedure of FIG. 5 is executed under the overall control by the ECU 44 of the autonomous work machine 10 shown in FIG. 2.

First, in step S501, the autonomous work machine 10 performs a trace travel operation along the perimeter of the work area AR (FIG. 4). By performing the trace travel operation before executing work in the work area AR, the ECU 44 of the autonomous work machine 10 is able to recognize (grasp) the work area AR, more specifically, the boundary of the work area AR. The lap direction in which the autonomous work machine performs the trace travel operation may be clockwise or counterclockwise.

Figure 6:
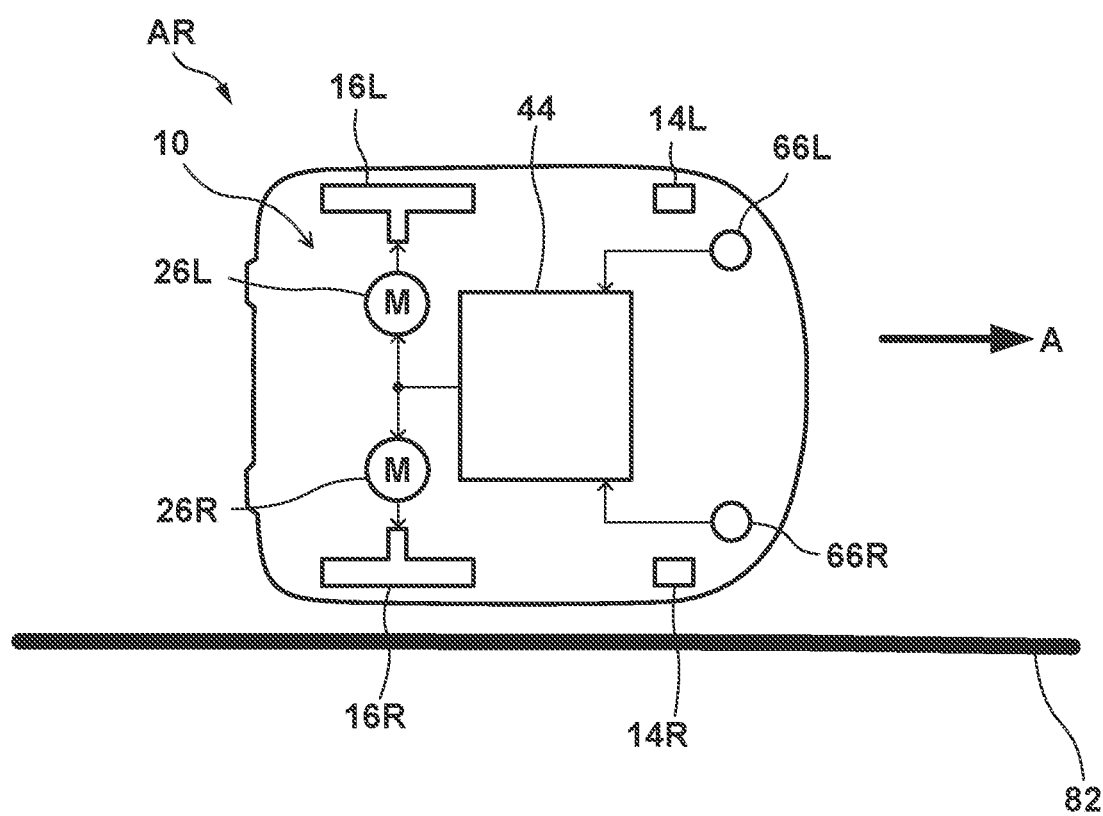
FIG. 6 is a flowchart for explaining a processing procedure executed by an autonomous work machine 10.

FIG. 6 is a view showing the operation of the autonomous work machine 10 during a trace travel operation. As shown in FIG. 6, during the trace travel operation, the autonomous work machine 10 will travel to do a lap along the perimeter by moving in the direction of an arrow A so that one magnetic detection sensor (for example, 66L) of the pair of left and right magnetic detection sensors 66 (the left magnetic detection sensor 66L and the right magnetic detection sensor 66R) is positioned on the inner side of the area wire 82 while the other magnetic detection sensor (for example, 66R) is positioned on the side of the area wire 82. The ECU 44 of the autonomous work machine 10 monitors the output from the right magnetic sensor 66R and controls the travel motors 26 (the left travel motor 26L and the right travel motor 26R) so that the detected magnetic field strength will be a predetermined value. As a result, the autonomous work machine can travel on the area wire 82 while bringing the right magnetic sensor 66R close to the area wire 82 and maintaining the magnetic field strength executed by the right magnetic sensor 66R at a predetermined value.

The trace travel operation is started in a state in which the charging terminal 34 of the autonomous work machine 10 is connected to the charging terminal 208 of the charging station ST, and ends when the charging terminal 34 of the autonomous work machine 10 is connected to the charging terminal 208 of the charging station ST again after the autonomous work machine 10 has done a lap along the area wire 82.

Referring back to FIG. 5, in step S502, the ECU 44 of the autonomous work machine 10 obtains information of a map related to the work area AR. Here, among the functional components of the autonomous work machine 10, the specification unit C1 specifies the self-position of the autonomous work machine 10 based on the information of a position detection unit (for example, 11, 46, or 48) for detecting the position information. The position of the autonomous work machine 10 from the start to the end of the trace travel operation is detected by the GPS sensor 48, and the azimuth corresponding to the terrestrial magnetism is detected by the azimuth sensor 46. In addition, the image information obtained by the camera unit 11 or the distance information obtained from images captured by the camera unit 11 with different parallaxes can be used. The specification unit C1 can specify the self-position of the autonomous work machine by using, as information of the position detection unit for detecting the position information, an output from the GPS sensor 48, the azimuth sensor 46, or the camera unit 11.

In addition, to specify the self-position, the specification unit C1 can receive a rotation signal pulse from each of the travel motors 26 (the left travel motor 26L and the right travel motor 26R), obtain, as odometry information, the travel distance of each of the left rear wheel 16L (left driving wheel) and the right rear wheel 16R (right driving wheel) converted from the corresponding rotation pulse generation count at a predetermined time interval, and use the obtained odometry information to specify the self-position.

Figure 7:
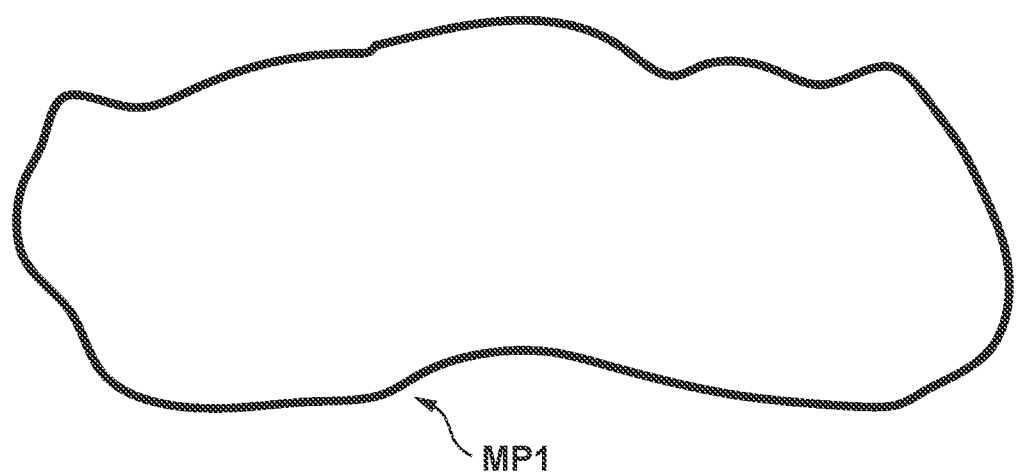
FIG. 7 is a view exemplifying a perimeter map MP1 of a work area AR.

Among the functional components of the autonomous work machine 10, the generation unit C5 generates a map that shows the shape of the work area AR based on the information of the self-position obtained during the travel along the perimeter of the work area AR. When traveling along the perimeter of the work area AR, the generation unit C5 stores the track of the movement of the self-position in the work area AR and generates a map MP1 that shows the shape of the perimeter of the work area AR with the charging station ST serving as a reference (origin). FIG. 7 is a view showing an example of the perimeter map MP1 of the work area AR, and the information of the no-work area NR delineated by the island wire 84 is not reflected in the perimeter map MP1.

Next, in step S503, the autonomous work machine 10 starts working in the work area AR under the control of the ECU 44. The autonomous work machine 10 starts moving from the charging station ST and works in the work area AR while traveling in the work area AR.

In step S504, the ECU 44 determines, based on the outputs from the magnetic sensors 66, whether a wire not included in the perimeter map MP1 has been detected. Among the functional components of the autonomous work machine 10, the determination unit C2 determines, based on the self-position, whether the autonomous work machine 10 has arrived at the perimeter portion of the no-work area NR positioned within the work area AR. Here, "the autonomous work machine 10 has arrived at the perimeter portion" is not limited to the arrival of the autonomous work machine above the perimeter portion of the no-work area NR, but also includes an area near the perimeter portion of the no-work area NR. For example, a range in which the magnetic field of the wire can be detected by each magnetic sensor 66 is also included as an area near the perimeter portion.

Since the position of the area wire 82 is already known by the determination unit C2 based on the perimeter map MP1 generated by the trace travel operation, in a case in which the wire detected based on the self-position in the work area AR is apart from the position of the area wire 82 of the work area AR, the determination unit C2 recognizes the detected wire as the island wire 84 that delineates the perimeter portion of the no-work area.

If there is no detection of a wire which is not present in the perimeter map MP1 (NO in step S504), that is, if the determination unit C2 determines, based on the self-position, that the autonomous work machine 10 has not arrived at the perimeter portion of the no-work area NR positioned within the work area AR, the process will return to step S503, the autonomous work machine will continue to work in the work area AR, and determination processing similar to that of step S504 will be performed.

Note that the information of the shape of the perimeter portion of the island wire 84 that has been reached by the autonomous work machine is stored in the memory 44*c*, and the determination unit C2 will determine whether the reached perimeter portion of the island wire 84 is an island wire along which the autonomous work machine has already done a lap in the past. If it is determined that the reached perimeter portion is an island wire along which the autonomous work machine has done a lap (the information of the perimeter portion of the island wire is held), the autonomous work machine can return to working normally. That is, in a case in which the reached perimeter portion of the island wire 84 is the island wire around which the autonomous work machine has already done a lap, the process is returned to step S503, and the autonomous work machine 10 will work in the work area AR based on the control of the ECU 44.

On the other hand, if a wire that is not present in the perimeter map MP1 is detected in the determination of step S504 (YES in step S504), that is, if the determination unit C2 has determined, based on the self-position, that the autonomous work machine 10 has arrived at the perimeter portion of the no-work area NR positioned within the work area AR, the determination unit C2 advances the process to step S505.

Figure 8A:
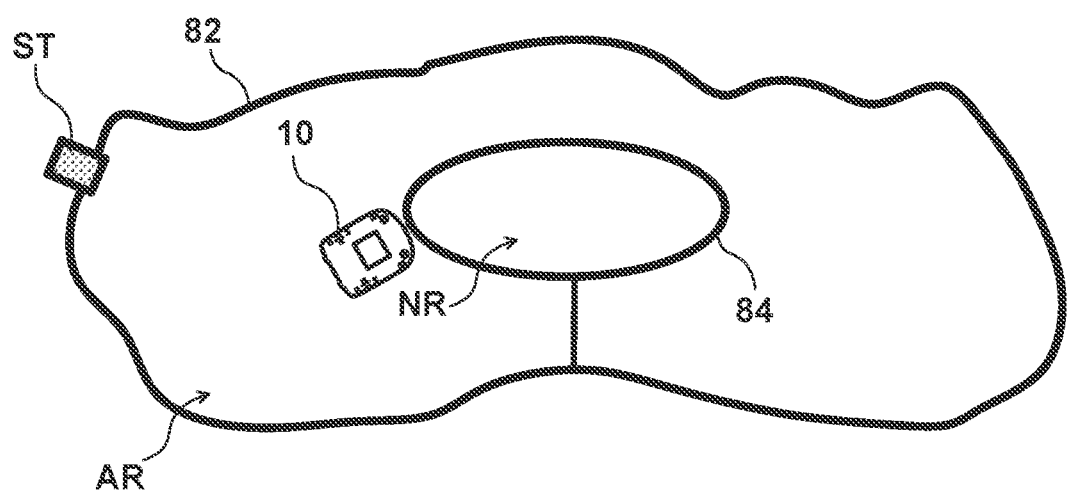
FIG. 8A is a view schematically showing a state in which the autonomous work machine has arrived at the perimeter portion of the no-work area.
Figure 8B:
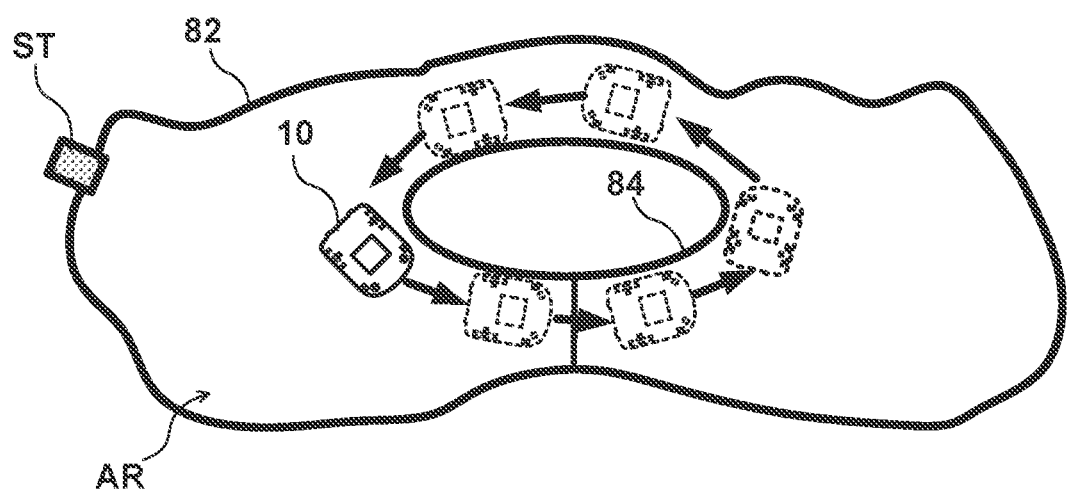
FIG. 8B is a view schematically showing the autonomous work machine tracing a wire.

In step S505, the ECU 44 controls the autonomous work machine 10 to trace the wire (the island wire 84) detected in step S504. FIG. 8A is a view schematically showing a state in which the autonomous work machine 10 has reached the perimeter portion of the no-work area NR positioned inside the work area AR, and FIG. 8B is a view schematically showing the autonomous work machine 10 tracing the detected wire (the island wire 84).

Among the functional components of the autonomous work machine 10, the control unit C3 controls the autonomous work machine 10 to do a lap along the perimeter portion of the no-work area NR when it is determined that the autonomous work machine 10 has reached the perimeter portion of the no-work area NR. Although an example in which the autonomous work machine does a lap in the counterclockwise direction is shown in FIG. 8B, the lap direction taken by the autonomous work machine to do a lap along the perimeter portion may be clockwise or counterclockwise. A lap around the perimeter portion in this case is not limited to a lap around the entire perimeter portion of the no-work area NR and may be a travel around a part of the perimeter portion. An arrangement for partially tracing the perimeter portion will be described in the second embodiment.

When doing a lap along the perimeter portion, the ECU 44 of the autonomous work machine 10 will monitor, in a manner similar to the trace travel operation of step S501, the output of one magnetic sensor 66 of the pair of left and right magnetic sensors 66 (the left magnetic sensor 66L and the right magnetic sensor 66R), and control the travel motors 26 (the left travel motor 26L and the right travel motor 26R) so that the detected magnetic field strength will be a predetermined value. As a result, the autonomous work machine can travel near the island wire 84 by bringing one of the magnetic sensors 66 near the island wire 84 while maintaining the magnetic field strength detected by the magnetic sensor 66 at a predetermined value.

In step S506, the control unit C3 determines whether the autonomous work machine 10 has returned near the position where the tracing was started. If it is determined that the autonomous work machine 10 has not returned near the position where the tracing was started (NO in step S506), the process returns to step S505, and the control unit C3 controls the autonomous work machine 10 to continue tracing the wire (the island wire 84).

On the other hand, if it is determined that the autonomous work machine 10 has returned near the position where the tracing was started (YES in step S506), the control unit C3 advances the process to step S507.

Subsequently, in step S507, the ECU 44 reflects, onto the perimeter map MP1, the position (shape) stored during the tracing (during the travel along the perimeter portion of the no-work area NR) of the wire (the island wire 84).

Figure 9A:
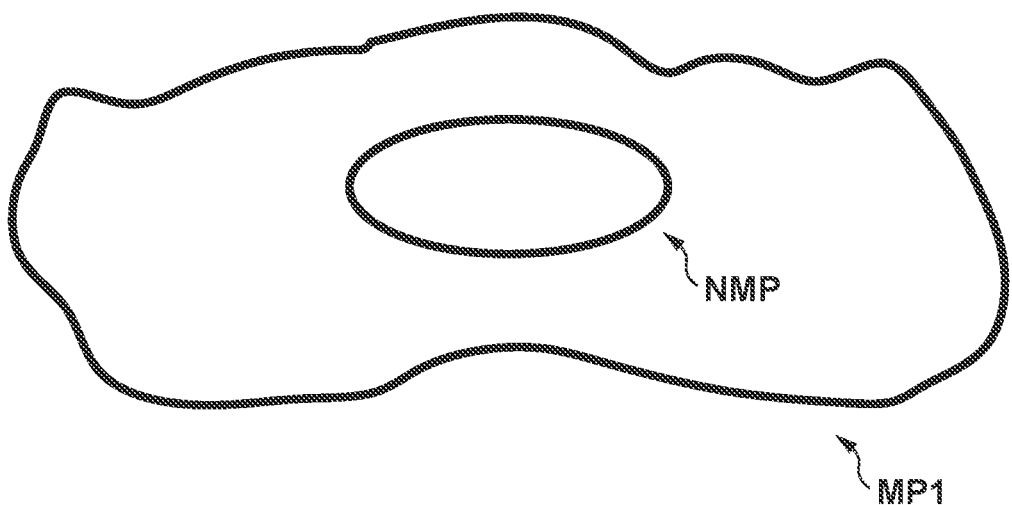
FIG. 9A is a view exemplifying a map NMP that shows the shape of the perimeter portion of a no-work area NR in the perimeter map MP1 of the work area.
Figure 9B:
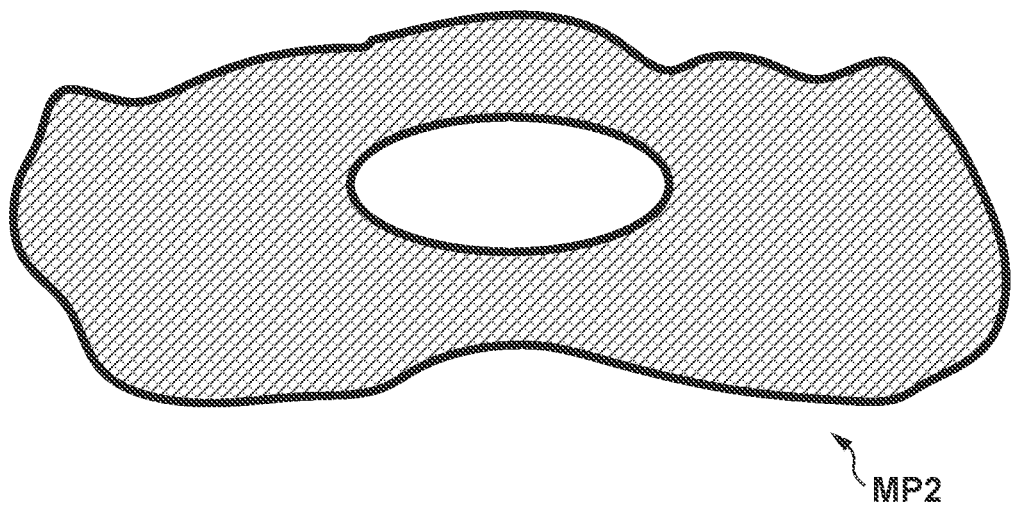
FIG. 9B is a view exemplifying a work area map MP2 obtained by excluding the shape of the no-work area from the perimeter map MP1.

FIG. 9A is a view exemplifying a map NMP that shows the shape of the perimeter portion of the no-work area NR in the perimeter map MP1 of the work area, and FIG. 9B is a view exemplifying a work area map MP2 obtained by excluding the shape of the no-work area from the perimeter map MP1.

When traveling along the perimeter of the work area AR, the generation unit C5 stores the track of the movement of its self-position and generates the map NMP (FIG. 9A) which shows the shape of the perimeter portion of the no-work area NR with the tracing start position set as the reference (origin). Based on the information of the self-position obtained during the lap around the perimeter portion of the no-work area NR, the generation unit C5 generates the work area map MP2 (FIG. 9B) in which the shape (the map NMP) of the no-work area NR has been excluded from the perimeter map MP1.

The work area map MP2 generated here becomes the final work area map of the work area AR reflecting (excluding) the shape of the no-work area NR. The generation unit C5 stores the generated work area map MP2 in the storage unit (the memory 44*c*). The maps MP2, MP1, and NMP generated by the generation unit C5 are stored in the storage unit (the memory 44*c*), and the information of each map can be referred in subsequent operations. As a result, the work area map MP2 that has higher accuracy can be generated by reflecting the shape of the no-work area NR to the perimeter map MP1 which shows the shape of the perimeter of the work area AR.

(Calculation of Degree of Progress)

Among the functional components of the autonomous work machine 10, the progress degree obtainment unit C6 uses the work area map MP2 (FIG. 9B) to obtain, as the degree of progress of the work, the ratio between the area obtained by excluding the shape of the no-work area NR from the shape of the perimeter of the work area AR and an area where the work has been actually completed. A predetermined threshold is set in relation to the threshold. When the degree of progress obtained by the progress degree obtainment unit C6 has reached the threshold, the control unit C3 can control the autonomous work machine 10 to end the work in the work area specified in the work area map MP2 or start work in a work area different from the current work area.

Figure 10:
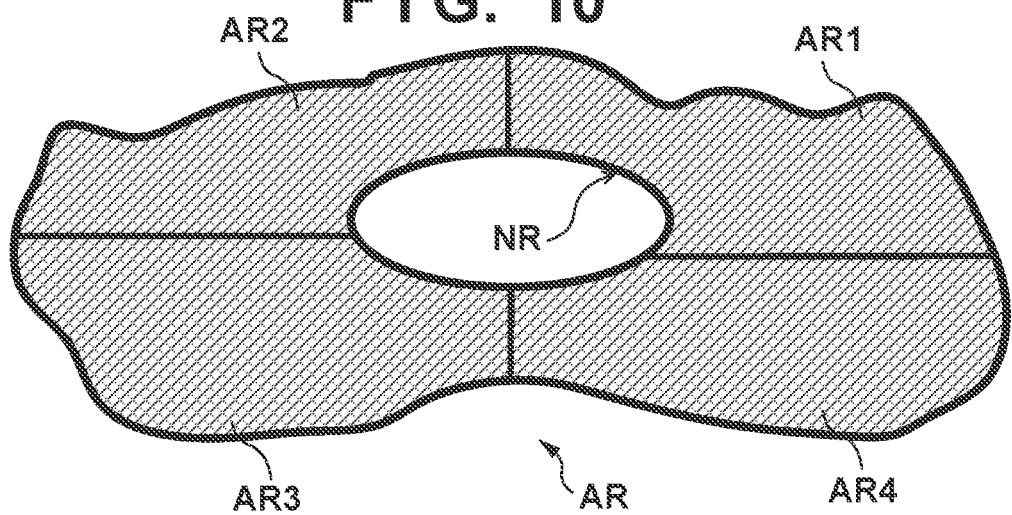
FIG. 10 is a view exemplifying a plurality of partial work areas.

FIG. 10 is a view exemplifying a plurality of partial work areas. For example, as shown in FIG. 10 the work area AR specified in the work area map MP2 can be divided into a plurality of partial work areas AR1 to AR4, and the degree of progress can be managed for each partial work area.

Second Embodiment

Figure 11:
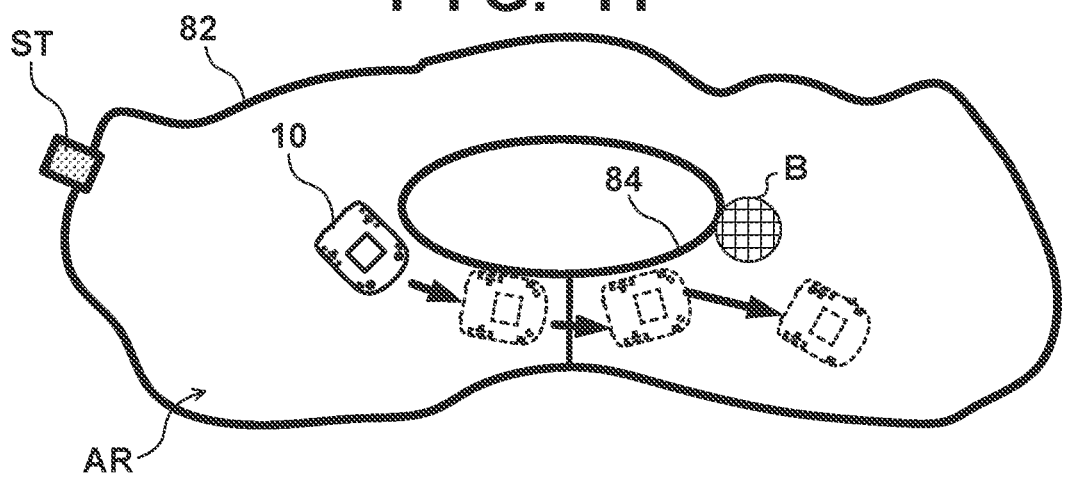
FIG. 11 is a view showing an example of partial tracing of the perimeter portion of a no-work area NR according to the second embodiment.

The first embodiment described processing in which the entire perimeter portion of a no-work area NR is traced. However, the second embodiment will describe an arrangement in which the perimeter is partially traced. FIG. 11 is a view showing an example of partial tracing of the perimeter portion of the no-work area NR according to the second embodiment, and shows an example in which an obstacle B is arranged in the periphery of the perimeter portion of the no-work area NR.

Among the functional components of an autonomous work machine 10, a state detection unit C4 (FIG. 2) detects the state of the autonomous work machine 10 based on information from an obtaining unit (for example, a camera unit 11, magnetic sensors 66, or a contact sensor 67) that obtains information of the external world of the autonomous work machine 10.

When the state detection unit C4 detects a phenomenon that can cause the lap around the perimeter portion of the no-work area NR to be suspended while the autonomous work machine 10 is doing a lap along the perimeter portion of the no-work area NR, a control unit C3 will control the autonomous work machine 10 to suspend the lap and shift to a state to execute the work (normal work).

An obstacle arranged in the periphery of the perimeter portion, a slope formed in the periphery of the perimeter portion, or an unevenness of the ground formed in the periphery of the perimeter portion can be a phenomenon that causes the lap along the perimeter portion to be suspended.

Third Embodiment

The second embodiment described, as an arrangement for partially tracing the perimeter portion, an arrangement in which the autonomous work machine is suspended from doing a lap along the perimeter portion and shifted to a state to execute work (normal work) when an obstacle as a phenomenon that causes the lap to be suspended has been detected. The third embodiment will describe an arrangement in which the movement of an autonomous work machine 10 is controlled to avoid an obstacle when the obstacle as a phenomenon that causes the lap to be suspended has been detected.

Figure 12:
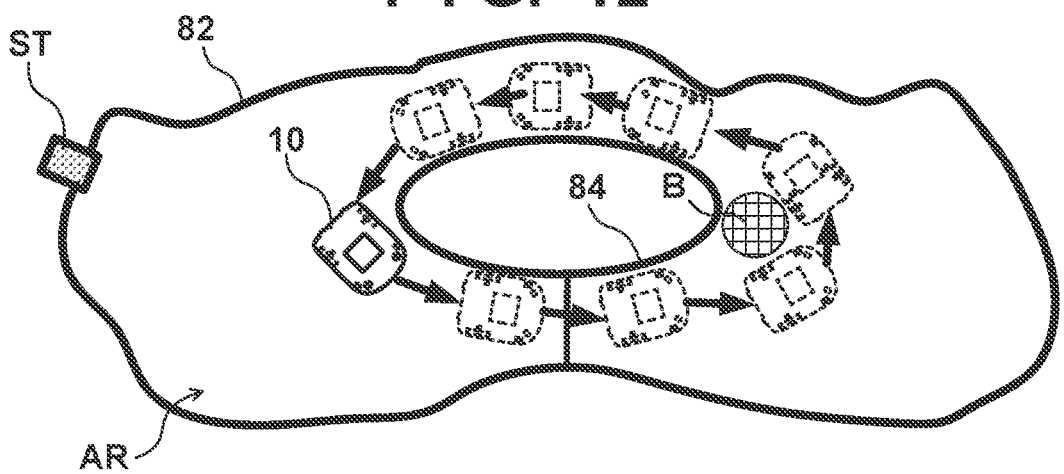
FIG. 12 is a view showing an example of partial tracing of the perimeter portion of a no-work area NR according to the third embodiment.

FIG. 12 is a view showing an example of partial tracing of the perimeter portion of a no-work area NR according to the third embodiment, and shows an example in which an obstacle B is arranged in the periphery of the perimeter portion of the no-work area NR. In a case in which a state detection unit C4 has detected the obstacle B while the autonomous work machine 10 is doing a lap along the perimeter portion of the no-work area NR, a control unit C3 will control the travel of the autonomous work machine 10 based on a track for bypassing the periphery of the obstacle B and continue the lap. The control unit C3 can use, for example, the information of the camera unit 11 to control the travel of the autonomous work machine 10 based on the track for bypassing the periphery of the obstacle B.

Fourth Embodiment

The third embodiment described, as an arrangement for partially tracing the perimeter portion, an arrangement in which the movement of an autonomous work machine 10 is controlled to cause the autonomous work machine to bypass an obstacle. The fourth embodiment will describe an arrangement in which the direction of the movement of the autonomous work machine 10 is reversed when a phenomenon that causes the lap to be suspended is detected.

Figure 13A:
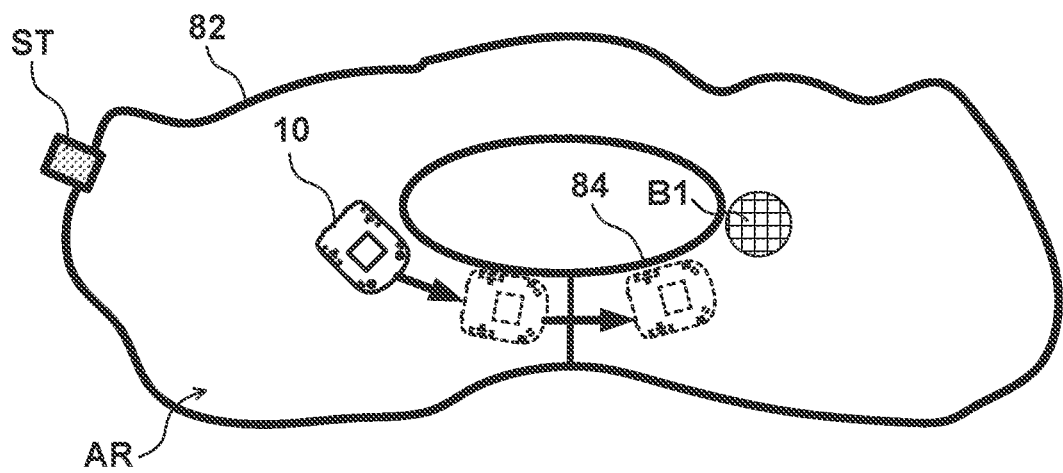
FIG. 13A is a view showing an example of partial tracing of the perimeter portion of a no-work area NR according to the fourth embodiment.
Figure 13B:
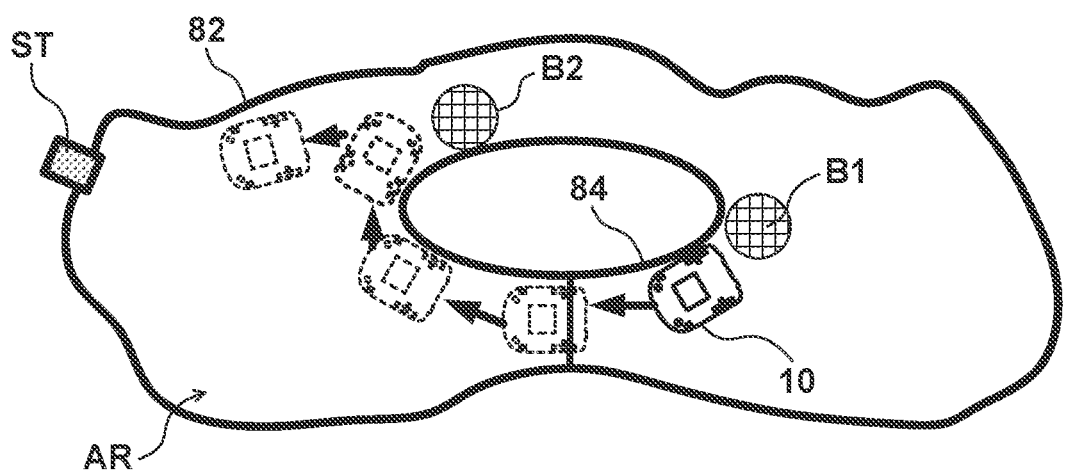
FIG. 13B is a view showing an example of the partial tracing of the perimeter portion of the no-work area NR according to the fourth embodiment.

FIGS. 13A and 13B are views each showing an example of the partial tracing of the perimeter portion of a no-work area NR according to the fourth embodiment, and each view shows an example in which obstacles B1 and B2 are arranged in the periphery of the perimeter portion of the no-work area NR. In a case (FIG. 13A) in which a state detection unit C4 has detected a phenomenon (for example, the obstacle B1) that causes the lap to be suspended while the autonomous work machine 10 is doing a lap along the perimeter portion, a control unit C3 will reverse the direction of the lap and control the autonomous work machine 10 to do a lap along the perimeter portion in the reverse direction as shown in FIG. 13B. If the state detection unit C4 detects another phenomenon (for example, the obstacle B2) that causes the lap to be suspended while the autonomous work machine 10 is doing a lap along the perimeter portion in the reverse direction, the control unit C3 will control the autonomous work machine 10 to suspend the lap and shift to a state to execute work (normal work).

Fifth Embodiment

The first embodiment described an arrangement in which a work area AR is delineated by an area wire (electrical wire) 82, a no-work area NR is delineated by an island wire (electrical wire) 84, and magnetic sensors 66 are used to detect the wires. However, the present invention is not limited to using wires, and the work area AR and the no-work area NR may be specified by using markers installed at a predetermined interval or by using a combination of wires and markers. For example, the work area AR may be specified by a wire and the no-work area NR may be specified by markers. Conversely, a reverse combination in which the work area AR is specified by markers and the no-work area NR is specified by a wire may also be employed.

In this case, a determination unit C2 can determine whether an autonomous work machine 10 has reached the perimeter portion of the no-work area NR by using the results obtained by detecting a wire or markers installed along the perimeter by an obtaining unit (for example, a camera unit 11, the magnetic sensors 66, or a contact sensor 67) that obtains information of the external world of the autonomous work machine.

Sixth Embodiment

The first embodiment described an arrangement in which an autonomous work machine 10 is controlled to do a lap along the perimeter portion of a no-work area NR when it is determined that the autonomous work machine has reached the perimeter portion of the no-work area NR. The sixth embodiment will describe an arrangement in which the autonomous work machine shifts to doing a lap along the perimeter portion based on the number of times the autonomous work machine has reached the perimeter portion or based on a work time in a work area after the autonomous work machine has reached the perimeter portion.

Figure 14:
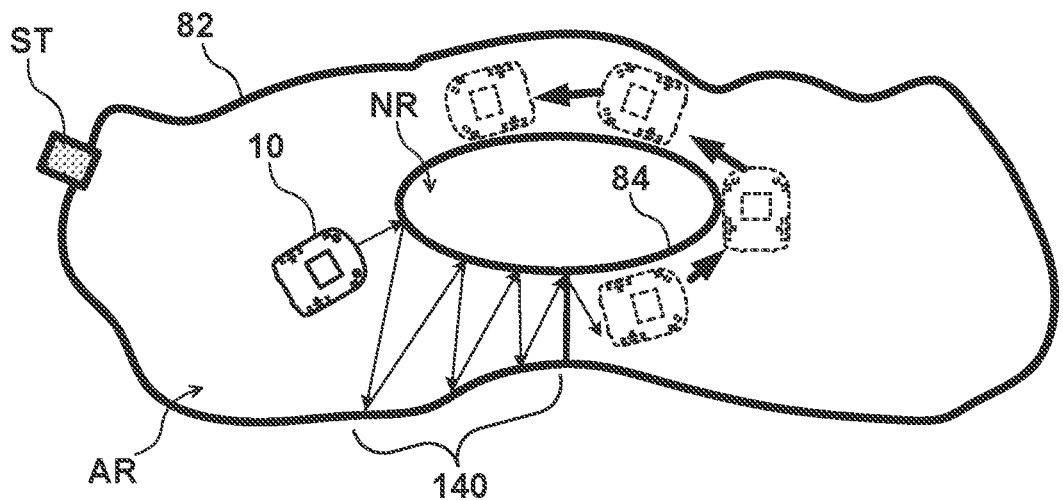
FIG. 14 is a view showing an example of partial tracing of the perimeter portion of a no-work area NR according to the sixth embodiment.
Figure 15:
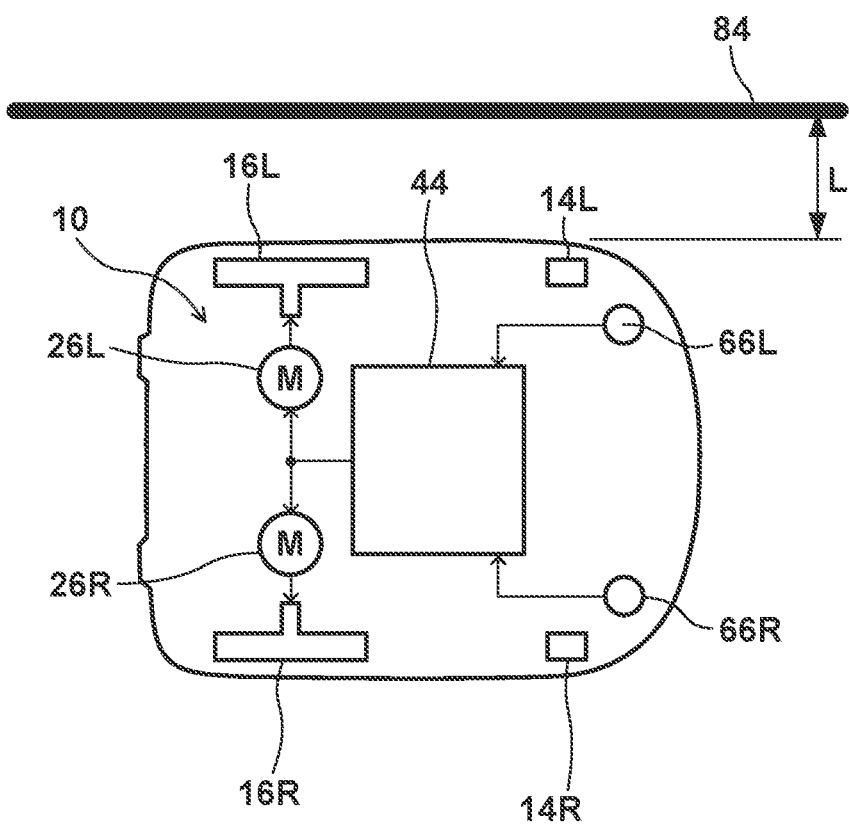
FIG. 15 is a view showing an example of the partial tracing of the perimeter portion of the no-work area NR according to the sixth embodiment.

FIGS. 14 and 15 are views each showing an example of tracing of the perimeter portion of the no-work area NR according to the sixth embodiment. Among the functional components of the autonomous work machine 10, an internal information obtainment unit C7 (FIG. 2) obtains internal area information (information about the presence/absence of a slope, the angle of the slope, the direction in which the slop is inclined, the presence/absence of an unevenness, and the like) of an work area AR. In a case in which a determination unit C2 has determined that the autonomous work machine 10 has reached the perimeter portion of the no-work area, a control unit C3 will reverse, as shown by, for example, reference numeral 140 in FIG. 14, the direction of travel of the autonomous work machine 10 at a predetermined angle and cause the autonomous work machine to continue the work in the work area. At this time, the internal information obtainment unit C7 will obtain the internal area information of the work area AR while the work is being continued.

Among the functional components of the autonomous work machine 10, an arrival count measurement unit C8 (FIG. 2) measures the number of times at which the autonomous work machine has reached the perimeter portion of the no-work area NR. When the count measured by the arrival count measurement unit C8 has become equal to or more than a predetermined count threshold, the control unit C3 can control the autonomous work machine 10 to suspend the work and shift to doing a lap along the perimeter portion of the no-work area NR.

Furthermore, among the functional components of the autonomous work machine 10, a time measurement unit C9 (FIG. 2) measures a work time in the work area. If the work time is equal to or more than a predetermined time threshold, the control unit C3 can control the autonomous work machine 10 to suspend the work and shift to doing a lap along the perimeter portion of the no-work area.

Here, when the autonomous work machine is to do a lap around the perimeter portion after shifting from the work state, the control unit C3 will control the autonomous work machine 10 based on the internal area information. The control unit C3 can determine, based on the internal area information, the direction of the lap around the perimeter portion. For example, to prevent the autonomous work machine from slipping, the direction of the lap around the perimeter portion can be determined to avoid a route that goes down a steep slope or unevenness. Also, as shown in FIG. 15, the control unit C3 can set, based on the internal area information, an interval distance L from the perimeter (for example, an island wire 84) of the no-work area NR to the track of the lap. As shown in FIG. 15, the left side, which is close to the island wire 84, of the autonomous work machine 10 is used as the reference of the interval distance L, but the center of the autonomous work machine 10 in the vehicle width direction may also be used as the reference. Alternatively, depending on the direction of the lap, the right side, which is close to the island wire 84, of the autonomous work machine 10 may be used as the reference.

Note that [0] "internal area information" can include an attribute of the no-work area NR. For example, in a case in which a pond is set as the attribute of the no-work area NR, the interval distance L may be set large, and in a case in which a simple obstacle is set as the attribute of the no-work area NR, the interval distance L may be set smaller than the case in which the attribute of the no-work area NR is the pond.

Summary of Embodiments

Arrangement 1. An autonomous work machine according to the above-described embodiment is an autonomous work machine (for example, 10 of FIGS. 1, 2) that works in a work area while autonomously traveling in the work area, comprising: a specification unit (for example, C1 of FIG. 2) configured to specify, based on information of a position detection unit (for example, 11, 46, 48) configured to detect position information, a self-position of the autonomous work machine (10);
    a determination unit (for example, C2 of FIG. 2) configured to determine, based on the self-position, whether the autonomous work machine (10) has reached a perimeter portion of a no-work area positioned within the work area; and
    a control unit (for example, C3 of FIG. 2) configured to control the autonomous work machine (10) to do a lap along the perimeter portion in a case in which the autonomous work machine (10) is determined to have reached the perimeter portion.

Arrangement 2. In the autonomous work machine according to the above-described embodiment, the control unit (C3) obtains the position information while the autonomous work machine (10) is traveling to do a lap along the perimeter portion, and specifies, based on the obtained position information, a shape of the perimeter portion of the no-work area.

According to the autonomous work machine of Arrangement 1 or Arrangement 2, the shape of the perimeter portion can be specified by causing the autonomous work machine to do a lap along the perimeter portion of the no-work area.

Arrangement 3. The autonomous work machine according to the above-described embodiment further comprises: a state detection unit (for example, C4 of FIG. 2) configured to detect the state of the autonomous work machine based on information obtained by an obtaining unit (for example, the camera unit 11, the magnetic sensors 66, or the contact sensor 67) configured to obtain external world information of the autonomous work machine (10).

According to the autonomous work machine of Arrangement 3, the detection result of the state of the autonomous work machine can be reflected to the control executed by the control unit.

Arrangement 4. In the autonomous work machine according to the above-described embodiment, in a case in which the state detection unit (C4) detects a phenomenon that causes the lap to be suspended while the autonomous work machine (10) is doing a lap along the perimeter portion, the control unit (C3) controls the autonomous work machine (10) to suspend doing the lap and shift to a state for executing the work.

According to the autonomous work machine of Arrangement 4, in a case in which a phenomenon that causes the lap to be suspended is detected while the autonomous work machine is doing a lap along the perimeter portion, it will be possible to obtain the shape information of a part of the no-work area based on the information obtained up to the middle of the lap while preventing a problem from occurring because of undue continuation of the lap.

Arrangement 5. In the autonomous work machine according to the above-described embodiment, in a case in which the state detection unit (C4) detects an obstacle while the autonomous work machine (10) is doing a lap along the perimeter portion, the control unit (C3) will control the travel of the autonomous work machine based on a track for bypassing a periphery of the obstacle to continue doing the lap.

According to Arrangement 5, even in a case in which an obstacle is detected while the autonomous work machine is doing a lap along the perimeter portion, the autonomous work machine can continue to do the lap by controlling the travel of the autonomous work machine so as to bypass the periphery of the obstacle.

Arrangement 6. In the autonomous work machine according to the above-described embodiment, in a case in which the state detection unit (C4) has detected a phenomenon that causes the lap to be suspended while the autonomous work machine (10) is doing the lap along the perimeter portion, the control unit (C3) will reverse the direction of the lap and control the autonomous work machine (10) to do a lap along the perimeter portion in the reverse direction, and in a case in which the state detection unit (C4) has detected a phenomenon that causes the lap to be suspended while the autonomous work machine is doing the lap along the perimeter portion in the reverse direction, the control unit (C3) will control the autonomous work machine (10) to suspend the lap and shift to a state for executing the work.

According to the autonomous work machine of Arrangement 6, in a case in which a phenomenon that causes the lap to be suspended is detected while the autonomous work machine is doing a lap along the perimeter portion, the autonomous work machine can be controlled to do a lap along the perimeter portion in the reverse direction to obtain more pieces of information of the shape of the perimeter portion of the no-work area.

Arrangement 7. In the autonomous work machine according to the above-described embodiment, the phenomenon that causes the lap to be suspended includes one of an obstacle arranged in a periphery of the perimeter portion, a slope formed in the periphery of the perimeter portion, and an unevenness of the ground formed in the periphery of the perimeter portion.

According to the autonomous work machines of Arrangements 4 and 7, in a case in which a phenomenon that causes the lap to be suspended is detected while the autonomous work machine is doing a lap along the perimeter portion, it will be possible to obtain the shape information of a part of the no-work area based on the information obtained up to the middle of the lap while preventing a problem (for example, the autonomous work machine falling into a pond while avoiding an obstacle, the autonomous work machine sliding from a steep slope and falling into a pond, or the like) from occurring because of undue continuation of the lap.

Arrangement 8. The autonomous work machine according to the above-described embodiment further comprises: a generation unit (for example, C5 of FIG. 2) configured to generate, based on information of the self-position obtained during the travel along the perimeter of the work area, a perimeter map (for example, MP1 of FIG. 7) that shows a shape of the work area, wherein the generation unit (C5) generates, based on the information of the self-position obtained while doing the lap along the perimeter portion of the no-work area, a work area map (for example, MP2 of FIG. 9B) excluding the shape of the no-work area from the perimeter map (MP1).

According to the autonomous work machine of Arrangement 8, a more accurate work area map can be generated by reflecting the shape of the no-work area in the perimeter map that shows the shape of the perimeter of the work area.

Arrangement 9. The autonomous work machine according to the above-described embodiment further comprises: a progress degree obtainment unit (for example, C6 of FIG. 2) configured to use the work area map to obtain, as a degree of progress of the work, a ratio between an area where the work has been completed and an area excluding the shape of the perimeter portion of the no-work area from the shape of the work area.

According to the autonomous work machine of Arrangement 9, a more accurate degree of progress of the work that has taken the no-work area into consideration can be obtained.

Arrangement 10. In the autonomous work machine according to the above-described embodiment, in a case in which the degree of progress has reached a threshold, the control unit (C3) will execute one of control to cause the autonomous work machine (10) to end work in the work area specified in the work area map (MP2) and control to cause the autonomous work machine to start work in a work are different from the specified work area.

According to the autonomous work machine of Arrangement 10, the autonomous work machine can be controlled based on a more accurate degree of progress of the work that has taken the no-work area into consideration.

Arrangement 11. In the autonomous work machine according to the above-described embodiment, the determination unit (C2) can determine whether the autonomous work machine (10) has reached the perimeter portion of the no-work area by using a result obtained by the obtaining unit (for example, the camera unit 11, the magnetic sensors 66, or the contact sensor 67) by detecting one of a wire laid along the perimeter portion and a marker installed along the perimeter portion.

According to the autonomous work machine of Arrangement 11, whether the autonomous work machine has reached the perimeter portion of the no-work area can be determined easily.

Arrangement 12. The autonomous work machine according to the above-described embodiment further comprises: an internal information obtaining unit (for example, C7 of FIG. 2) configured to obtain internal area information of the work area,
  wherein in a case in which the determination unit (C2) determines that the autonomous work machine (10) has reached the perimeter portion, the control unit (C3) will reverse a direction of travel of the autonomous work machine (10) at a predetermined angle and cause the autonomous work machine to continue the work in the work area, and
  the internal information obtainment unit (C7) will obtain the internal area information while the work is continued.

Arrangement 13. The autonomous work machine according to the above-described embodiment further comprises: an arrival count measurement unit (for example, C8 of FIG. 2) configured to measure the number of times the autonomous work machine has reached the perimeter portion,
  wherein in a case in which the number of times has become not less than a predetermined count threshold, the control unit (C3) controls the autonomous work machine (10) to suspend the work and shift to doing a lap along the perimeter portion.

Arrangement 14. The autonomous work machine according to the above-described embodiment further comprises: a time measurement unit (for example, C9 of FIG. 2) configured to measure a work time in the work area, wherein in a case in which the work time is not less than a predetermined time threshold, the control unit (C3) controls the autonomous work machine (10) to suspend the work and shift to doing a lap along the perimeter portion.

Arrangement 15. In the autonomous work machine according to the above-described embodiment, while doing the lap along the perimeter portion after the shift, the control unit (C3) controls the autonomous work machine (10) based on the internal area information.

According to the autonomous work machines of Arrangements 12 to 15, the autonomous work machine can be controlled to do a lap along the perimeter portion after considering the information related to the perimeter portion of the no-work area based on the internal area information and recognizing, to a certain extent, the shape of the work area near the perimeter portion.

Arrangement 16. In the autonomous work machine according to the above-described embodiment, the control unit (C3) determines a direction of a lap along the perimeter portion based on the internal area information.

According to the autonomous work machine of Arrangement 16, the autonomous work machine can be controlled to do a lap along the perimeter portion after recognizing, to a certain extent, the shape (for example, a steep slope, an unevenness, or the like) of the work area near the perimeter portion. For example, since the autonomous work machine may slip in the track of a lap along a steep downhill slope, the direction of the lap can be determined so that the track of the lap will be uphill. As a result, the direction of the lap can be determined to prevent slips and falls.

Arrangement 17. In the autonomous work machine according to the above-described embodiment, the control unit (C3) sets, based on the internal area information, an interval distance (for example, L of FIG. 15) from the perimeter portion (for example, the island wire 84) of the no-work area to a track of the lap.

According to the autonomous work machine of Arrangement 17, by setting an interval distance from the perimeter portion of the no-work area to the track of a lap, it will be possible to determine a track of a lap in which slips and falls can be prevented in, for example, a case in which the no-work area is a pond, a case in which the work area near the perimeter portion sloped downhill toward the no-work area, and the like.

Arrangement 18. In the autonomous work machine according to the above-described embodiment, in a case in which the work area specified in the work area map (MP2) is divided into a plurality of partial work areas (for example, AR1 to AR4 of FIG. 10), the progress degree obtainment unit (C6) obtains a degree of progress of the work in each partial work area.

According to the autonomous work machine of Arrangement 18, a more accurate degree of progress of the work that takes the no-work area into consideration can be obtained for each of the plurality of partial work areas.

Arrangement 19. A method of controlling an autonomous work machine according to the above-described embodiment is a method of controlling an autonomous work machine (for example, 10 of FIGS. 1, 2) that works in a work area while traveling autonomously in the work area, the method comprising: a specification step (for example, C1 of FIG. 2) of specifying, based on information of a position detection unit (for example, 11, 46, 48) configured to detect position information, a self-position of the autonomous work machine (10);

a determination step (for example, C2 of FIG. 2) of determining, based on the self-position, whether the autonomous work machine (10) has reached a perimeter portion of a no-work area positioned within the work area; and a control step (for example, C3 of FIG. 2) of controlling the autonomous work machine (10) to do a lap along the perimeter portion in a case in which the autonomous work machine is determined to have reached the perimeter portion.

According to the method of controlling the autonomous work machine of Arrangement 19, the autonomous work machine can do a lap along the perimeter portion of the no-work area to specify the shape of the perimeter portion.

Arrangement 20. A program according to the above-described embodiment causes a computer to function as each unit of an autonomous work machine defined in any one of Arrangements 1 to 18.

According to the program of Arrangement 20, the function of the autonomous work machine according to the present invention can be implemented by a computer.

The present invention is not limited to the above embodiments and various changes and modifications can be made within the spirit and scope of the present invention. Therefore, to apprise the public of the scope of the present invention, the following claims are made.

What is claimed is:

1. An autonomous work machine that works in a work area while autonomously traveling in the work area using a perimeter map showing a shape of a perimeter of the work area, comprising:
at least one processor circuit with a memory comprising instructions, that when executed by the processor circuit, causes the at least one processor circuit to at least:
specify, based on information of a position detection unit configured to detect position information, a self-position of the autonomous work machine;
determine that the autonomous work machine has reached a perimeter portion of a no-work area positioned within the work area, in a case in which a magnetic field of a wire, which is not included in the perimeter map, has been detected based on outputs of magnetic sensors while travelling in the work area based on the self-position;
control the autonomous work machine to do a lap along the perimeter portion in a case in which the autonomous work machine is determined to have reached the perimeter portion; and
generate a map that shows the shape of the perimeter portion of the no-work area based on the information of the self-position of the autonomous work machine obtained during a travel of the lap along the perimeter portion of the no-work area.

2. The autonomous work machine according to claim 1, wherein the controlling of the autonomous work machine further comprises obtaining the position information while the autonomous work machine is traveling to do the lap along the perimeter portion, and specifies, based on the obtained position information, a shape of the perimeter portion of the no-work area.

3. The autonomous work machine according to claim 1, wherein the instructions, when executed by the processor circuit, further cause the at least one processor circuit to at least:

detect a state of the autonomous work machine based on information obtained, the information obtained including external world information of the autonomous work machine.

4. The autonomous work machine according to claim 3, wherein in a case in which a phenomenon is detected that causes the lap to be suspended while the autonomous work machine is doing the lap along the perimeter portion, the instructions, when executed by the processor circuit, further cause the at least one processor circuit to at least control the autonomous work machine to suspend doing the lap and shift to a state for executing the work.

5. The autonomous work machine according to claim 3, wherein in a case in which an obstacle is detected while the autonomous work machine is doing the lap along the perimeter portion, the instructions, when executed by the processor circuit, further cause the at least one processor circuit to at least control the travel of the autonomous work machine based on a track for bypassing a periphery of the obstacle to continue doing the lap.

6. The autonomous work machine according to claim 3, wherein the instructions, when executed by the processor circuit, further cause the at least one processor circuit to at least:
  in a case in which a phenomenon is detected that causes the lap to be suspended while the autonomous work machine is doing a lap along the perimeter portion, reverse the direction of the lap and control the autonomous work machine to do a reverse lap along the perimeter portion in the reverse direction, and
  in a case in which a phenomenon is detected that causes the lap to be suspended while the autonomous work machine is doing the reverse lap along the perimeter portion in the reverse direction, control the autonomous work machine to suspend the lap and shift to a state for executing the work.

7. The autonomous work machine according to claim 4, wherein the phenomenon that causes the lap to be suspended includes one of an obstacle arranged in a periphery of the perimeter portion, a slope formed in the periphery of the perimeter portion, and an unevenness of the ground formed in the periphery of the perimeter portion.

8. The autonomous work machine according to claim 1, wherein the instructions, when executed by the processor circuit, further cause the at least one processor circuit to at least:
  generate, based on information of the self-position obtained during the travel along the perimeter of the work area, a perimeter map that shows a shape of the work area.

9. The autonomous work machine according to claim 8, wherein the instructions, when executed by the processor circuit, further cause the at least one processor circuit to at least:
  use the work area map to obtain, as a degree of progress of the work, a ratio between an area where the work has been completed and an area excluding the shape of the perimeter portion of the no-work area from the shape of the work area.

10. The autonomous work machine according to claim 9, wherein the instructions, when executed by the processor circuit, further cause the at least one processor circuit to at least, in a case in which the degree of progress has reached a threshold, execute one of control to cause the autonomous work machine to end work in the work area specified in the work area map and control to cause the autonomous work machine to start work in a work area different from the specified work area.

11. The autonomous work machine according to claim 3, wherein the instructions, when executed by the processor circuit, further cause the at least one processor circuit to at least determine whether the autonomous work machine has reached the perimeter portion of the no-work area by using a result obtained by detecting one of a wire laid along the perimeter portion and a marker installed along the perimeter portion.

12. The autonomous work machine according to claim 1, wherein the instructions, when executed by the processor circuit, further cause the at least one processor circuit to at least:
  obtain internal area information of the work area,
  in a case in which it is determined that the autonomous work machine has reached the perimeter portion, reverse a direction of travel of the autonomous work machine at a predetermined angle and cause the autonomous work machine to continue the work in the work area, and
  obtain the internal area information while the work is continued.

13. The autonomous work machine according to claim 12, wherein the instructions, when executed by the processor circuit, further cause the at least one processor circuit to at least:
  measure the number of times the autonomous work machine has reached the perimeter portion, and
  wherein in a case in which the number of times has become not less than a predetermined count threshold, control the autonomous work machine to suspend the work and shift to doing the lap along the perimeter portion.

14. The autonomous work machine according to claim 12, wherein the instructions, when executed by the processor circuit, further cause the at least one processor circuit to at least:
  measure a work time in the work area, and
  in a case in which the work time is not less than a predetermined time threshold, control the autonomous work machine to suspend the work and shift to doing the lap along the perimeter portion.

15. The autonomous work machine according to claim 13, wherein the instructions, when executed by the processor circuit, further cause the at least one processor circuit to at least, while doing the lap along the perimeter portion after the shift, control the autonomous work machine based on the internal area information.

16. The autonomous work machine according to claim 14, wherein the instructions, when executed by the processor circuit, further cause the at least one processor circuit to at least determine direction of the lap along the perimeter portion based on the internal area information.

17. The autonomous work machine according to claim 15, wherein the instructions, when executed by the processor circuit, further cause the at least one processor circuit to at least set, based on the internal area information, an interval distance from the perimeter portion of the no-work area to a track of the lap.

18. The autonomous work machine according to claim 9, wherein the instructions, when executed by the processor circuit, further cause the at least one processor circuit to at least, in a case in which the work area specified in the work area map is divided into a plurality of partial work areas, obtain a degree of progress of the work in each partial work area.

19. A method of controlling an autonomous work machine that works in a work area while traveling autonomously in the work area using a perimeter map showing a shape of a perimeter of the work area, the method comprising:
   specifying, based on information of a position detection unit configured to detect position information, a self-position of the autonomous work machine;
   determining that the autonomous work machine has reached a perimeter portion of a no-work area positioned within the work area, in a case in which a magnetic field of a wire, which is not included in the perimeter map, has been detected based on outputs of magnetic sensors while travelling in the work area based on the self-position;
   controlling the autonomous work machine to do a lap along the perimeter portion in a case in which the autonomous work machine is determined to have reached the perimeter portion; and
   generating a map that shows the shape of the perimeter portion of the no-work area based on the information of the self-position of the autonomous work machine obtained during a travel of the lap along the perimeter portion of the no-work area.

20. A non-transitory computer readable storage medium that stores instructions that cause a processor circuit having a processor and a memory to function to cause an autonomous work machine that works in a work area while autonomously traveling in the work area using a perimeter map showing a shape of a perimeter of the work area to at least:
   specify, based on information of a position detection unit configured to detect position information, a self-position of the autonomous work machine;
   determine that the autonomous work machine has reached a perimeter portion of a no-work area positioned within the work area, in a case in which a magnetic field of a wire, which is not included in the perimeter map, has been detected based on outputs of magnetic sensors while travelling in the work area based on the self-position;
   control the autonomous work machine to do a lap along the perimeter portion in a case in which the autonomous work machine is determined to have reached the perimeter portion; and
   generate a map that shows the shape of the perimeter portion of the no-work area based on the information of the self-position of the autonomous work machine obtained during a travel of the lap along the perimeter portion of the no-work area.

21. The autonomous work machine according to claim 1, wherein the instructions, when executed by the processor circuit, further cause the at least one processor circuit to at least, in the case in which the autonomous work machine is determined to have reached the perimeter portion, control the autonomous work machine to do the lap along the perimeter portion while maintaining a magnetic field strength detected by the magnetic sensors at a predetermined value.

* * * * *